(12) United States Patent
Anfray et al.

(10) Patent No.: US 8,871,839 B2
(45) Date of Patent: Oct. 28, 2014

(54) METHOD FOR HEATING A COMPOSITE MATERIAL AREA TO BE REPAIRED

(71) Applicant: Aircelle, Gonfreville l'Orcher (FR)

(72) Inventors: Emmanuel Anfray, Saint Martin du Manoir (FR); Franck Maze, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 14 days.

(21) Appl. No.: 13/901,181

(22) Filed: May 23, 2013

(65) Prior Publication Data

US 2013/0261231 A1 Oct. 3, 2013

Related U.S. Application Data

(63) Continuation of application No. PCT/FR2011/052639, filed on Nov. 15, 2011.

(30) Foreign Application Priority Data

Nov. 25, 2010 (FR) ...................................... 10 59705

(51) Int. Cl.
*H05B 1/02* (2006.01)
*B29C 73/34* (2006.01)
*H05B 3/36* (2006.01)

(52) U.S. Cl.
CPC .............. *H05B 1/0294* (2013.01); *B29C 73/34* (2013.01)
USPC ................................ 524/1; 219/480; 219/528

(58) Field of Classification Search
CPC ....................................................... H05B 1/0294
USPC ................................................ 524/1; 219/480
See application file for complete search history.

(56) References Cited

FOREIGN PATENT DOCUMENTS

| DE | 102004062064 A1 | * | 6/2006 |
|---|---|---|---|
| DE | 102004062064 A1 | | 7/2006 |
| EP | 1962562 A1 | | 8/2008 |
| FR | 2537824 A1 | | 6/1984 |

OTHER PUBLICATIONS

DE 10 2004 062064 A1—Eichenauer et al.—machine translation—Jun. 7, 2006.*

* cited by examiner

*Primary Examiner* — Bijan Ahvazi
*Assistant Examiner* — Ronald Grinsted
(74) *Attorney, Agent, or Firm* — Brinks Gilson & Lione

(57) ABSTRACT

A method for heating a composite material area to be repaired includes placing a primary heating pad on the area to be repaired, and placing one or more satellite heating pads on the periphery of the primary pad in a manner that the satellite heating pads are adjacent to the edges of the primary pad.

5 Claims, 5 Drawing Sheets

METHOD FOR HEATING A COMPOSITE MATERIAL AREA TO BE REPAIRED

CROSS-REFERENCE TO RELATED APPLICATIONS

Figure 1:

This application is a continuation of International Application No. PCT/FR2011/052639, filed on Nov. 15, 2011, which claims the benefit of FR 10/59705, filed on Nov. 25, 2010. The disclosures of the above applications are incorporated herein by reference.

FIELD

The present disclosure relates to the field of repairs carried out on composite materials, in particular for the aeronautics sector.

BACKGROUND

The statements in this section merely provide background information related to the present disclosure and may not constitute prior art.

It is necessary to be able to carry out repairs on parts or parts of components made of composite materials, for example internal fixed structures (IFS) of nacelles for aircraft engines. These structures are indeed subject to degradation that can result in particular from overheating, from the impact of projectiles during the course of a flight or while undergoing maintenance (the falling of a tool, for example).

The repairing of composite parts, formed from fibres embedded in the polymerised resin by curing, requires an increase in temperature, generally located in the area 190° C.

Such a temperature increase makes it possible in effect to fluidify and to polymerise the resin of the composite plies used for repairing the part in question.

Typically, in order to locally raise the temperature of the part to be repaired, use is made of heating pads, that is to say electrical resistance grids embedded in silicone mats: this is, for example, included in the teaching of the earlier patent application EP 1 962 562.

These resistors are connected to an electrical current, which is regulated by means of using one or more thermocouples placed in proximity of the area to be heated.

In practice, there are two main disadvantages: on the one hand, it is very difficult to obtain a homogeneous distribution of the temperature over the entire surface to be repaired, and on the other hand, it takes a considerable amount of time to achieve stabilisation of temperatures at certain points of this surface.

SUMMARY

The present disclosure provides a method for heating an area of composite material to be repaired, wherein one primary (main) heating pad is placed over the area to be repaired, and as well, one or more satellite (secondary) heating pads are placed around the periphery of this primary heating pad and in a manner such that they are adjacent to the edges of this primary pad.

Thus by using this particular arrangement, it is possible to compensate for the loss of heat at the periphery of the primary heating pad, and thereby obtain the rapid stabilisation of temperatures throughout the area covered by the structure of the primary heating pad.

In one form, at least one thermocouple is placed under each of the primary and satellite pads, and the electrical power supplied to each of these pads is controlled on an ongoing basis and in an independent manner in order to obtain the homogeneity and the rapid rate of stabilisation desired for the temperatures over the entire extent of the surface area covered by the primary heating pad.

In another form, the thermocouples for controlling the satellite heating pads are placed in the proximity of the junction of these pads with the primary heating pad, and they are assigned a set point value that enables the optimisation of the temperature distribution under the primary heating pad.

On an optional basis, it is possible to consider placing heat conducting plates such that they span across the junction of the satellite pads with the central pad, in order to improve the homogenisation of temperatures under the primary heating pad under the effect of the satellite pads.

Further areas of applicability will become apparent from the description provided herein. It should be understood that the description and specific examples are intended for purposes of illustration only and are not intended to limit the scope of the present disclosure.

DRAWINGS

Figure 2:
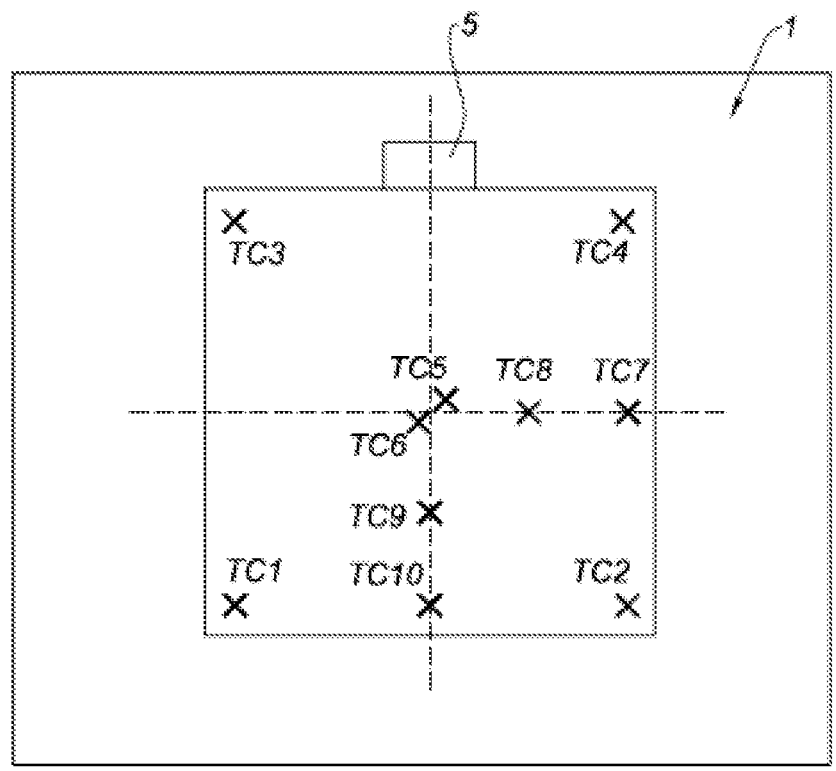
Figure 3:
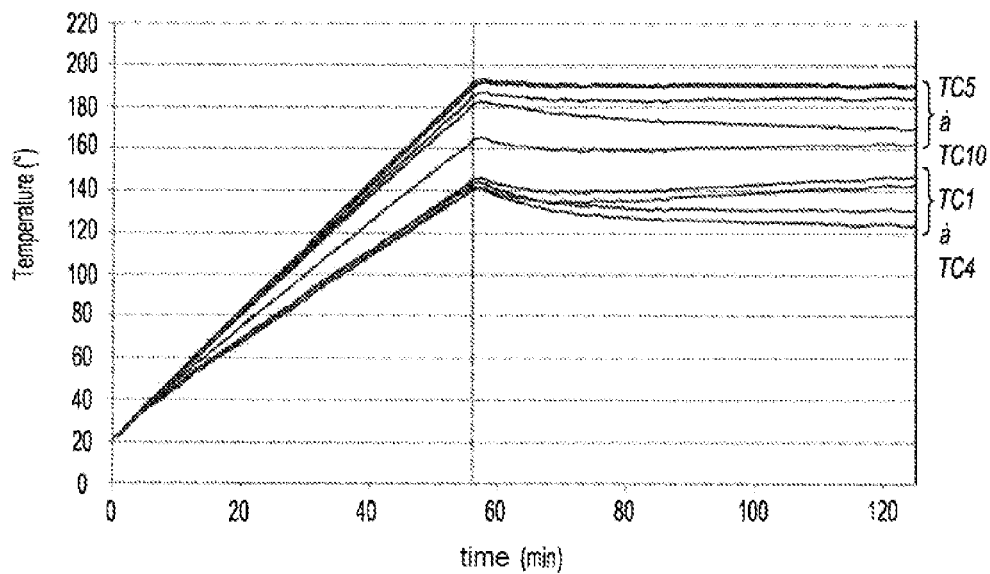
Figure 4:
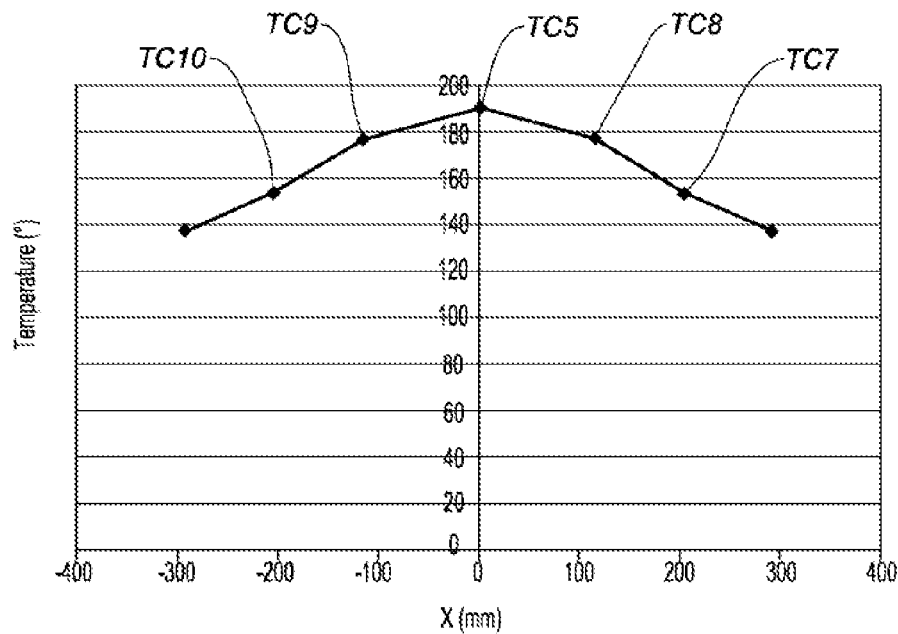
Figure 7:
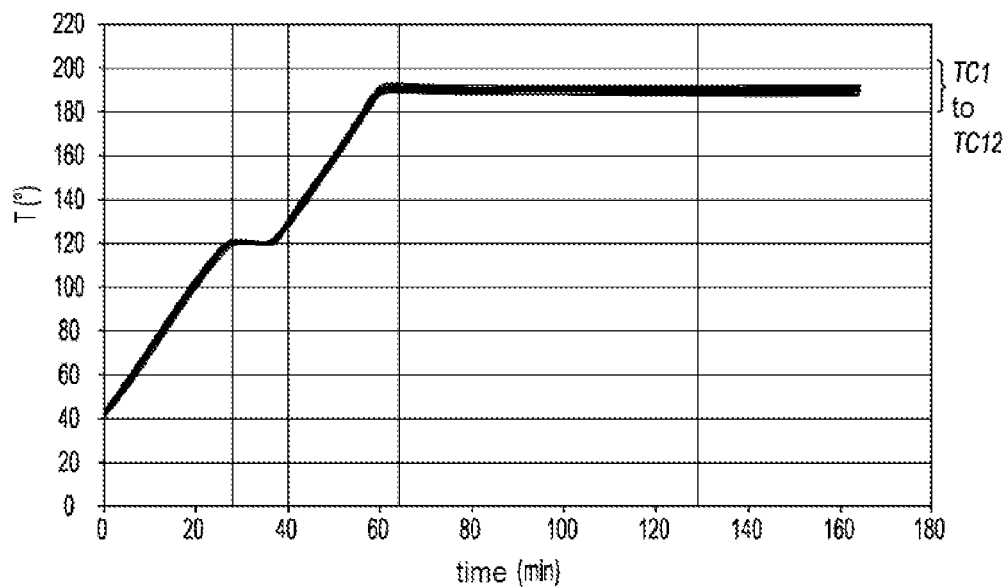
Figure 8:
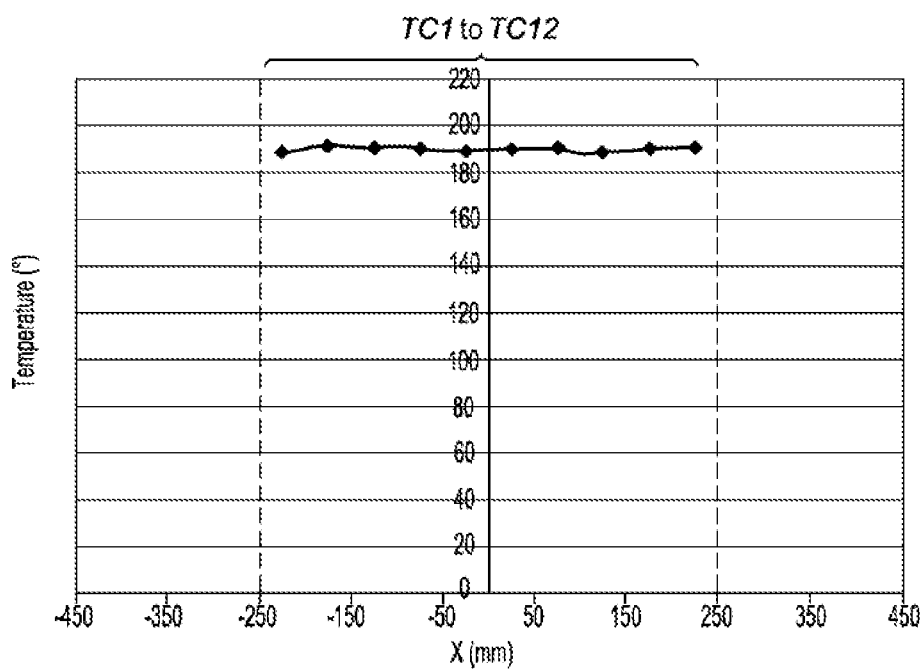
Figure 9:
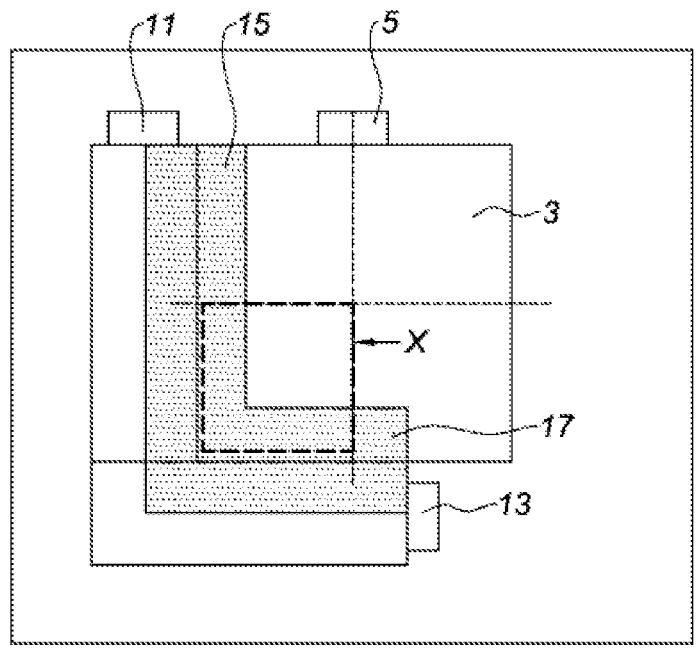
Figure 10:
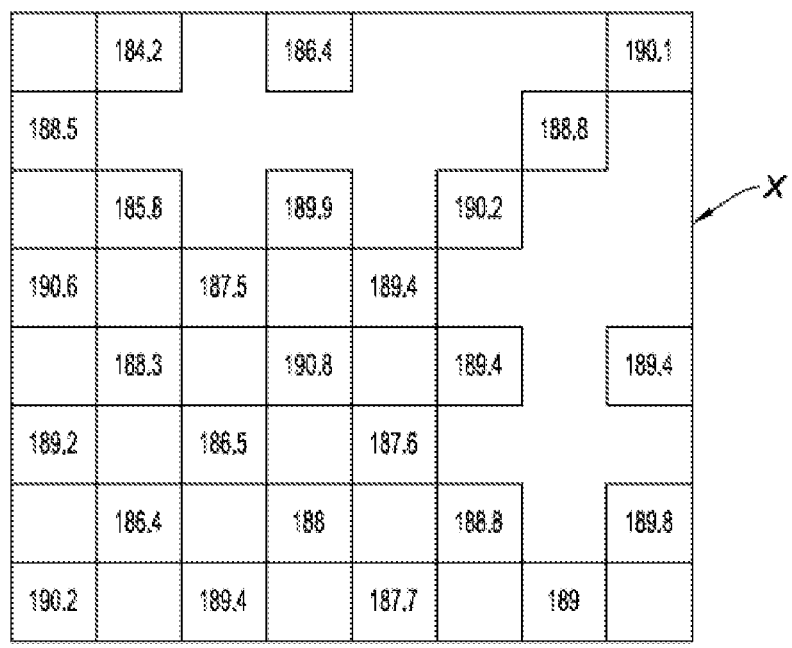

In order that the present disclosure may be well understood, there will now be described various forms thereof, given by way of example, reference being made to the accompanying drawings, in which:

FIG. 1 is a cross sectional view of a heating pad of the prior art, positioned on an area of composite material to be repaired, FIG. 2 is a view from the top of the assembly in FIG. 1, FIG. 3 is a graphic illustrating the evolution over time of the temperatures measured at several locations of the structure covered with the heat pad shown in FIGS. 1 and 2, FIG. 4 is a graphic illustrating the distribution of temperatures over the structure relative to the centre of the heating pad shown in FIGS. 1 and 2, FIGS. 5 to 8 are respectively figures that are similar to FIGS. 1 to 4, for a method according to the disclosure, for implementing on the one hand, a primary heating pad and on the other hand, the satellite heating pads, FIG. 9 illustrates a particular positioning of satellite heating pads around a primary heating pad, in conformity with the method according to the present disclosure, and FIG. 10 illustrates the distribution of temperatures over a part of the structure covered by the main heating pad in FIG. 9.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical or similar reference numerals designate similar or members or assemblies of members that are identical or similar.

With reference now to FIGS. 1 and 2, on which is represented an earlier part made out of composite material 1 on which is applied a heating pad 3, with the objective of carrying out local repairs on the part 1, in accordance with the general precepts that have been outlined in the preamble of this present description.

The part made of composite material 1 is formed of carbon fibres or other materials, embedded in the mass of polymerised resin.

The heating pad 3 typically includes a network of resistors embedded in the mass of a silicone mat, this network of resistors being capable of being supplied by a source of electrical current by way of an electrical connection pad 5.

An electronic control apparatus, not shown in the figures attached herewith, make it possible to send to the connection pad 5 a current whose power is determined on the one hand, from a temperature set point for the heating pad 3 imposed by an operator, and on the other hand, from actual values of temperatures measured by one or more thermocouples distributed in the proximity of the surface to be heated.

As is known per se, the actual measurements of temperatures by these thermocouples allow, by means of one or more feedback loops, for adjusting the power of the electric current sent over the connection pad 5 by the electronic apparatus.

As stated in the preamble of the present description, the disadvantages of a heating pad such as has just been described above, lies on the one hand, in the fact that once the climb gradient had been obtained and the target temperature level had been reached and maintained on the selected control point, it took a certain amount of time for the other measurement points to be able to stabilise in temperature, and on the other hand, in the fact that once this stabilisation had been reached, there was a noted lack of homogeneity of the temperatures over the surface of the repair.

This is illustrated in particular in FIG. 3, in which are shown the curves for the increase in temperature of the heating pad 3, as measured by a plurality of thermocouples TC1 to TC10 distributed as shown in FIG. 2: thermocouples TC1 to TC4 are located in the corner areas of the heating pad 3 and the other thermocouples TC5 to TC10 are to be found in the more central area of the heating pad.

FIG. 3 shows on the one hand, that the temperatures at the level of certain thermocouples TC1 to TC10 present some difficulty with respect to getting stabilised under the conditions of the experiment carried out, even 60 minutes after the target level.

FIG. 3 shows on the other hand, that once stabilised, the temperatures present a significant disparity in the different areas of the heating pad 3: relatively low temperatures (between 120° C. and 150° C.) in the corner areas of the heating pad (TC1 to TC4), and relatively high temperatures (between 160° C. to 195° C.) in the more central area of the heating pad (TC5 to TC10).

This is corroborated by the graphic in FIG. 4, on which is shown on the abscissa the distance measured from the centre of the heating pad, in respect of which it is assumed in the context of this present discussion that it has a substantially square shape with side measuring 500 mm.

As can be seen from this FIG. 4, the only area where the temperature corresponds substantially to the temperature set point desired in order to carry out the repair of the composite material, namely 190° Celsius, is the central area of the heating pad; this temperature will then go on decreasing gradually as one approaches the edges of the heating pad.

In order to overcome these drawbacks related to slow stabilisation and inhomogeneity in the distribution of temperatures, the method according to the disclosure proposes the placing of one or more "satellite" heating pads around the periphery of the said "primary" heating pad 3 in the following section/s.

Figure 5:
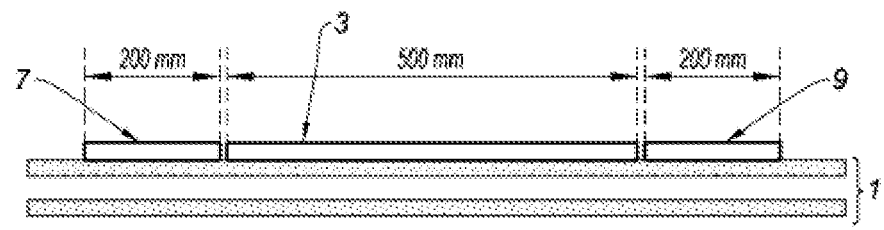
Figure 6:
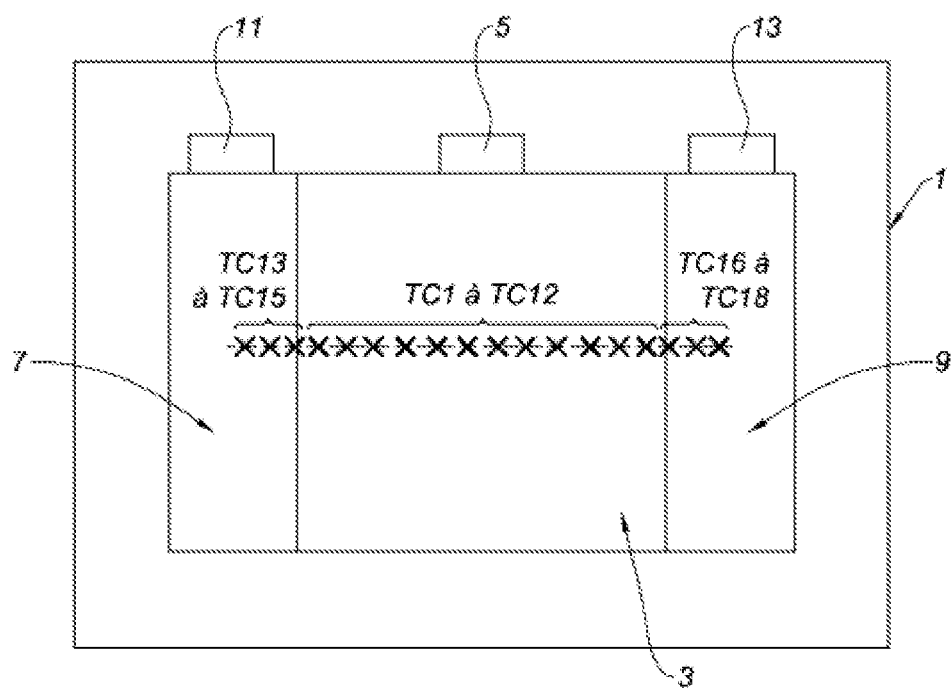

This is illustrated in particular in FIGS. 5 and 6, wherein it is shown that two satellite heating pads 7 and 9 have been placed of both sides of the primary heating pad 3, such that they are adjacent to the edges of the primary heating pad.

The satellite heating pads 7 and 9 are of the same nature as the primary heating pad 3, and thus include in particular the connection pads 11 and 13, that are meant for supplying electrical power to the heating pads.

By way of example, in the event where the primary heating pad 3 is presented in the form of a square with each side measuring 500 mm, it can be envisaged that each of the satellite heating pads 7 and 9 has a substantially rectangular shape of measuring 500 mm in length and 200 mm in breadth.

Ideally, the thermocouples TC13 to TC18 of the satellite heating pads 7 and 9 are positioned in a manner such that these thermocouples are in the proximity of the junction areas of these satellite heating pads with the primary pad.

Thus use is made on the one hand, of these thermocouples TC13 to TC18, and on the other hand, of one or more of the thermocouples TC1 to TC12 arranged in a central area of the primary heating pad 3 in order to control the supply of electric power for all of these pads by means of the electronic apparatus (not shown) on which the operator would have set a temperature set point value (typically 190° C., as previously indicated above).

With the particular arrangement which has just been described above, it is possible to obtain, for electric power conditions comparable to those used for the experiment carried out with the single heating pad 3 (FIGS. 1 to 4), a rapid stabilisation of the temperature of the primary heating pad 3, as is shown in FIG. 7, from the moment of arriving at the target temperature level. The temperatures measured over the surface area covered by the central pad are stable and virtually do not change any more.

As further indicated in the graphic in FIG. 7, the thermocouples TC1 to TC12 spread over the primary heating pad 3 demonstrate temperatures that highlight a significant homogeneity therein.

This is confirmed by the graph in FIG. 8, which is similar to the one in FIG. 4: as one moves away from the centre of the primary heating pad 3, one notes that there has been virtually no change in temperature.

FIG. 9 shows a particular arrangement that is in accordance with the present disclosure, in which the satellite heating pads 7 and 9 may be arranged on two adjacent edges of the primary heating pad 3.

In addition, it is possible to add, in this arrangement as in the preceding one, the conductive plates 15 and 17, thereby providing for thermal bridges between the satellite heating pads and the primary heating pad, and thus facilitating a homogenous distribution of temperatures over the heated structure.

FIG. 10 shows the temperatures measured in the area X in FIG. 9, corresponding to the lower left quadrant of the surface area covered by the primary heating pad 3, specifically on the side where the satellite pads 7, 9 had been positioned. It may be noted that there is a very slight variation in these temperatures relative to the set point temperature of 190° Celsius imposed by the operator on the primary heating pad 3.

Quite obviously it should be noted that the apparatus that is used to control the temperatures of the control points of the satellite pads 7 and 9 and the primary heating pad 3 is designed to control these temperature in an independent manner. This apparatus constantly adjusts the power supplied to the satellite pads 7 and 9, in a manner so as to ensure the maintenance of the desired temperature set point at the control points selected for these pads.

As can be understood in the light of the foregoing description, the method according to the present disclosure makes it possible, with very few, or even with one single point of measurement of temperature on the primary heating pad 3, to compensate continuously for the heat losses that occur in the edge areas of this primary pad, and thus on the one hand, to obtain a significantly rapid rate of temperature stabilisation of the area to be repaired under the primary pad, and on the other hand, a high degree of homogeneity in these temperatures.

The disadvantages attached to the prior art may thus be resolved in a very simple manner.

It is obviously understood, that the present disclosure is not in any way limited to the forms described and shown herein, which have merely been provided by way of simple examples.

What is claimed is:

1. A method for heating an area of composite material to be repaired, comprising;
    placing one primary heating pad over the area to be repaired;
    covering the entire area to be repaired with the primary heating pad; and
    placing at least one satellite heating pad outside a periphery of the area to be repaired in a manner that the at least one satellite heating pad is adjacent to edges of the primary heating pad and not covering any portion of the area to be repaired.

2. A method according to claim 1, further comprising placing at least one thermocouple under each of the primary heating pad and satellite heating pads and controlling on an ongoing basis and in an independent manner in order to obtain a homogeneity and a rapid rate of stabilisation desired for temperatures over the entire extent of the area covered by the primary heating pad.

3. A method according to claim 2, wherein the at least one thermocouple for controlling the satellite heating pads is placed in proximity of a junction of satellite heating pads with the primary heating pad, and the at least one thermocouple is assigned a set point value that provides a homogeneity of a temperature distribution under the primary heating pad.

4. A method according to claim 1, further comprising placing heat conducting plates spanning across a junction of the satellite heating pads with a central pad, in order to improve a homogenisation of temperatures under the primary heating pad under an effect of the satellite heating pads.

5. A composite structure repaired according to the method of claim 1.

* * * * *